US012610218B2

(12) United States Patent
Kim

(10) Patent No.: US 12,610,218 B2
(45) Date of Patent: Apr. 21, 2026

(54) IN-MESSAGING CALCULATION OF FORMULA RESULTS

(71) Applicant: T-Mobile USA, Inc., Bellevue, WA (US)

(72) Inventor: Michael L. Kim, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 294 days.

(21) Appl. No.: 18/457,827

(22) Filed: Aug. 29, 2023

(65) Prior Publication Data

US 2025/0080954 A1 Mar. 6, 2025

(51) Int. Cl.
H04W 4/14 (2009.01)
G06F 17/11 (2006.01)

(52) U.S. Cl.
CPC ............... H04W 4/14 (2013.01); G06F 17/11 (2013.01)

(58) Field of Classification Search
CPC ................................. H04W 4/14; G06F 17/11
See application file for complete search history.

(56) References Cited

U.S. PATENT DOCUMENTS

| 2022/0004710 A1 | 1/2022 | Wroczynski et al. | |
| 2022/0086110 A1* | 3/2022 | Jalil | H04L 51/04 |

OTHER PUBLICATIONS

Search Report for European Application No. 24196159.8, Dated Jan. 28, 2025, 8 pages.

* cited by examiner

*Primary Examiner* — Myron Wyche
(74) *Attorney, Agent, or Firm* — Lee & Hayes, P.C.

(57) ABSTRACT

System and methods for determining that a textual representation of input received from a user includes a formula and calculating a result of the formula are described herein. The textual representation is at least part of a message for a message recipient. After calculating the result, the message is provided to the message recipient, with the message including the formula and the result. Either or both of the message sender or message recipient may display the result from the formula either in place of the formula in a user interface (UI) showing the textual representation or in addition to the formula in the UI.

20 Claims, 4 Drawing Sheets

200

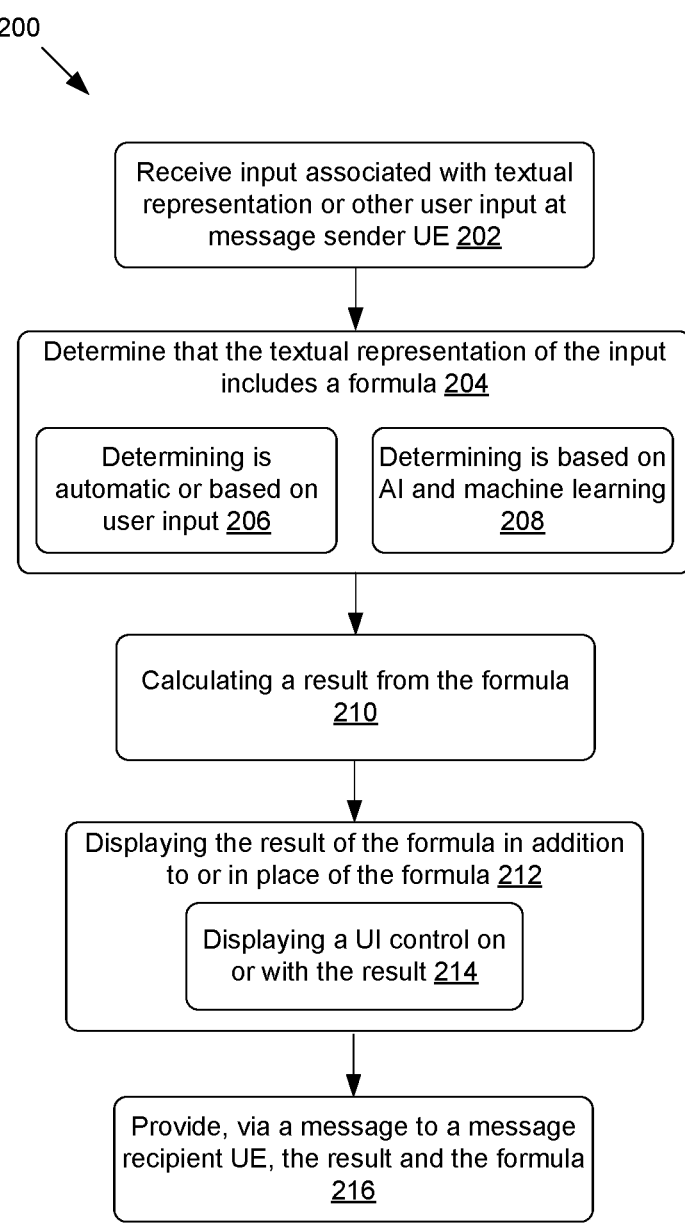

Receive input associated with textual representation or other user input at message sender UE 202

Determine that the textual representation of the input includes a formula 204

Determining is automatic or based on user input 206

Determining is based on AI and machine learning 208

Calculating a result from the formula 210

Displaying the result of the formula in addition to or in place of the formula 212

Displaying a UI control on or with the result 214

Provide, via a message to a message recipient UE, the result and the formula 216

IN-MESSAGING CALCULATION OF FORMULA RESULTS

BACKGROUND

In a messaging exchange between user devices, such as user equipment (UE) devices communicating over a wireless network, users may enter many kinds of information and content, such as text, pictures, etc. Different types of messaging, such as short message service (SMS), multimedia message service (MMS), rich communication service (RCS), email, Whatsapp®, imessage, and chatbot messaging may allow different kinds of content as part of a messaging exchange. Some implicit content, however, may result in the need for a user to navigate to a different application or service on the user's UE. For example, if a user has typed in a formula, calculation of a formula result may result in the user or the user's communication partner needing navigate to a calculator of the UE, possibly multiple times if the user is unable to copy the formula and is relying on memory. Resulting frustration may lead to a shorter messaging exchange and even less use of the messaging platform or UE.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is a flow diagram of an illustrative process at a message sender UE for determining that a textual representation of input from the message sender includes a formula, calculating a result of the formula, and providing the result and the formula in a message to a message recipient UE.

DETAILED DESCRIPTION

This disclosure is directed in part to UEs configured to determine that a textual representation of input received from a message sender includes a formula and calculate a result of that formula. A message sender UE could receive input, such as typed or spoken input, represent that input as a textual representation, and determine that the textual representation includes a formula. Such a determination may be automatic, responsive to a textual character included with the formula, may be based on user activation of a control, or may be based on artificial intelligence and machine learning. After determining that the textual representation includes a formula, the message sender UE calculates a result of the formula. The message sender UE then provides to a message recipient UE, via a message, the formula and result. In some implementations, the message sender UE also displays, on a user interface (UI) one or both of the formula or result.

In some implementations, the textual representation comprises single message input by the message sender. Alternatively or additionally, the textual representation comprise multiple messages. For example, when the textual representation is a list of numbers (or a list including numbers), each number may be provided in a separate message. In such an implementation, the numbers in the multiple messages and any context indicating what mathematical operation to perform (e.g., add the numbers) can comprise the formula, and the result of the formula could, e.g., replace the last number in the list, be a link from the last number in the list, be a clickable result available when a number from the list is clicked, be represented in an additional, auto-generated message, etc.

In various implementations, the message recipient UE may receive the message from the message sender UE, and the message may include at least the formula. The message recipient UE, upon receiving the message, may determine that it includes the formula and, if the message does not include the formula result, may calculate the result. The determination and calculation may be responsive to a character included in the formula itself, may be automatic, or may be in response to user interaction with a physical or virtual control. The message recipient UE may then display the result from the formula either in place of the formula in a UI showing the textual representation or in addition to the formula in the UI.

The operations of the UEs may be implemented by messaging platforms of the UEs. Alternatively, some or all of those operations may be performed by a network device, such as a messaging center or other server. The messages may be SMS messages, MMS messages, RCS messages, email messages, Whatsapp® messages, imessages, or chatbot messages, and the manner in which the formula and result are represented in the messages may be dependent on the message type.

Example Environment

Figure 1:
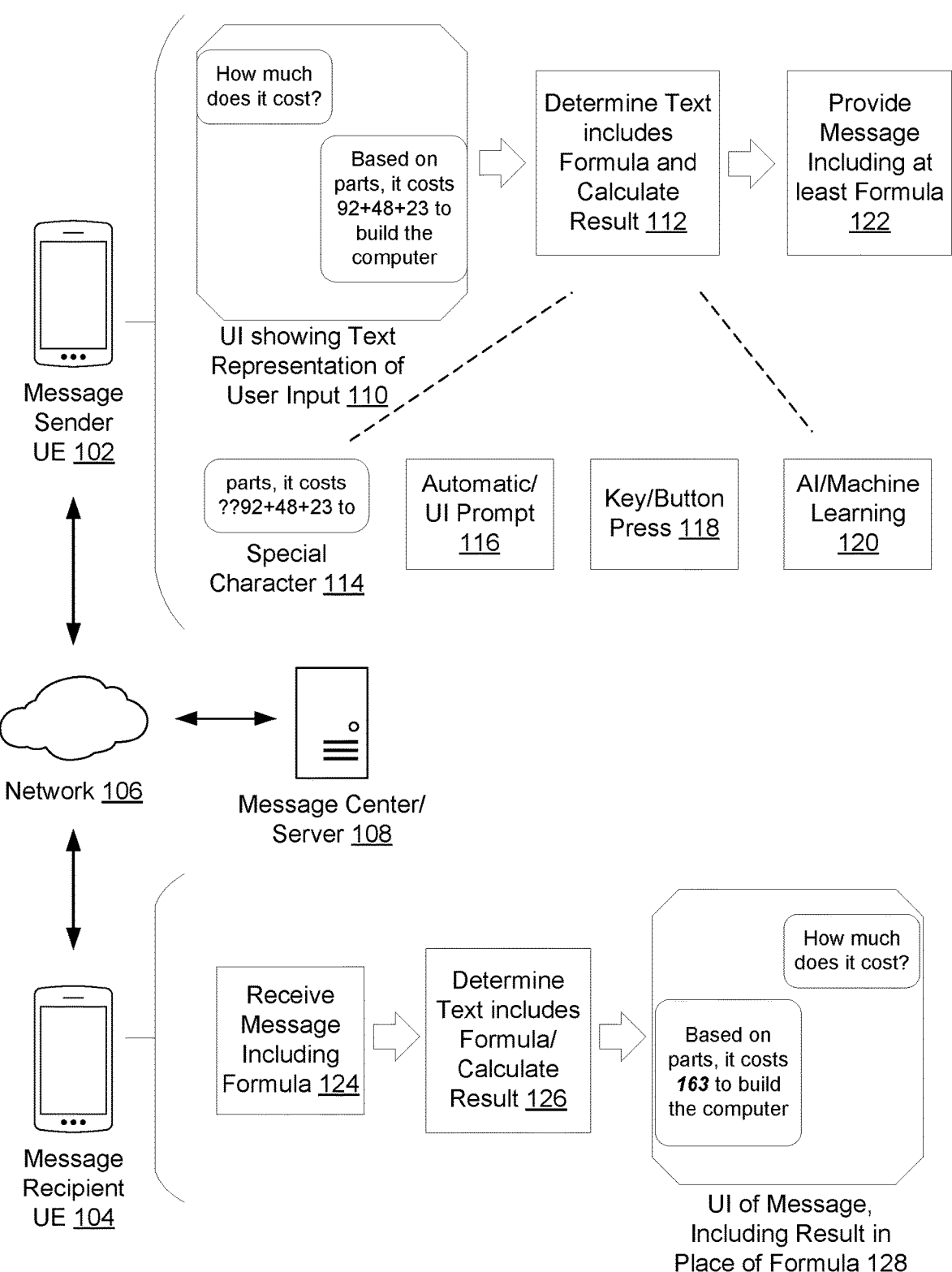
FIG. 1 is a schematic diagram of UEs engaged in messaging and handling formulas input by users as part of the messaging, calculating results of those formulas and providing the results and formulas as parts of the messages exchanged.

FIG. 1 is a schematic diagram of UEs engaged in messaging and handling formulas input by users as part of the messaging, calculating results of those formulas and providing the results and formulas as parts of the messages exchanged. As illustrated, a message sender UE 102 ("UE 102") may engage in a messaging exchange with a message recipient UE 104 ("UE 104"). The UE 102 and UE 104 are connected by a network 106 and may communicate with each other and with a message center/server 108 through the network 106. The UE 102 may present, on a user interface (UI) 110 of the UE 102 a textual representation of input received from a user of the UE 102. At 112, UE 102 may determine that the textual representation includes a formula and may calculate a result of the formula. The determining at 112 may be responsive to a special character 114 included in the textual representation, to automatic recognition 116 (e.g., confirmed by a UI prompt), to a key press or button press 118, or to artificial intelligence (AI) and machine learning 120. At 122, the UE 102 provides a message including the formula (and, in some implementations, the result) to the UE 104. At 124, the UE 104 receives the message including the formula. At 126, the UE 104 determines that the message includes a formula and, if the message does not include the result as well, calculates the result. The UE 104 then displays a UI 128 of the textual representation included in the message, including the result in place of the formula.

Figure 4:
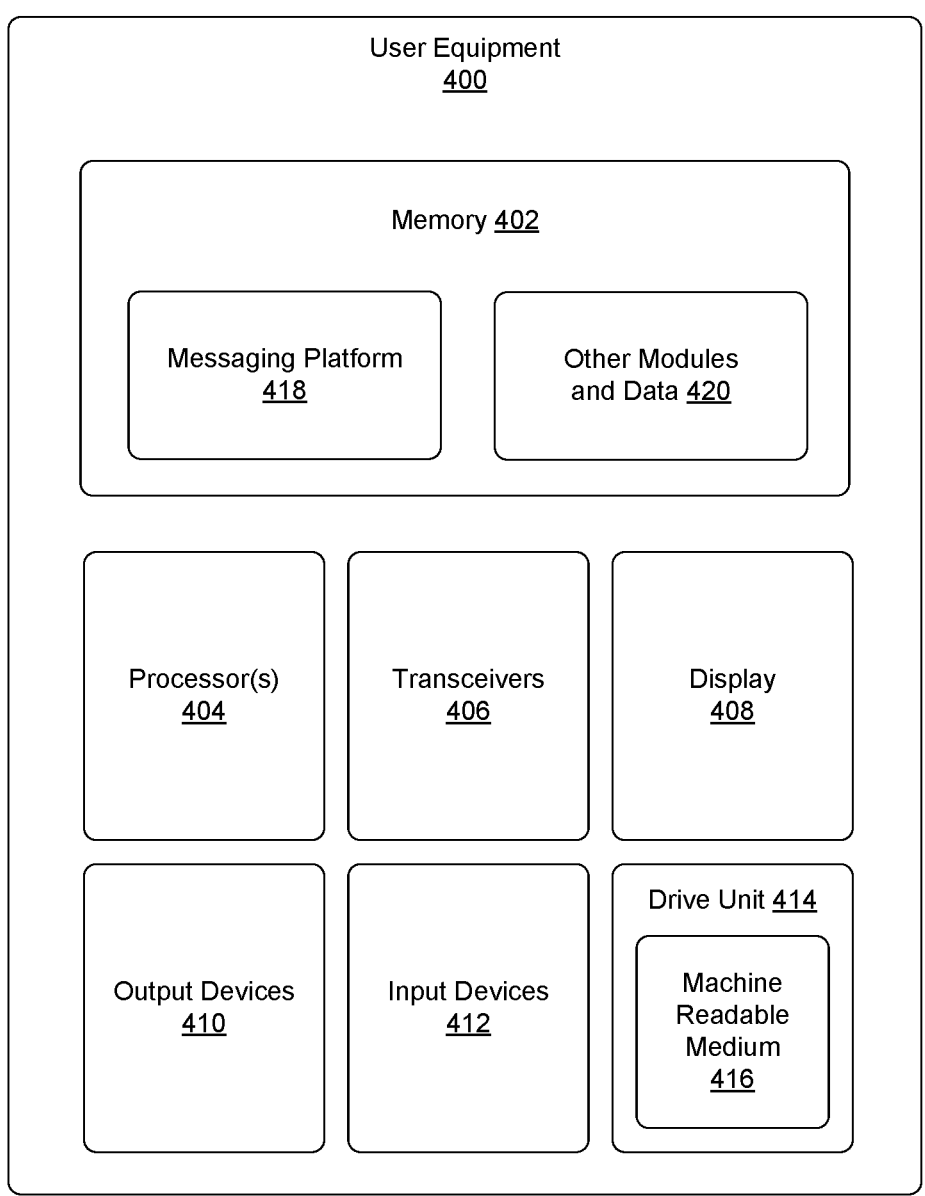
FIG. 4 is a schematic diagram of an example system architecture of a UE that is configured to determine that a textual representation of user input in a message includes a formula and to calculate a result of that formula.

In various implementations, the UE 102 and UE 104 may each be any sort of UE configured to communicate with the network 106 and with wireless networks, such as cellular networks and unlicensed wireless networks (e.g., Wi-Fi). The UE 102 and UE 104 may each be a mobile device, such as a cell phone, a watch, goggles, glasses, an Internet-of-Things (IoT) device, a tablet computer, a laptop computer, a personal computer (PC), or any sort of computing device capable of mobility and wireless communication. Additionally, UE 102 and UE 104 may each be configured with a messaging platform, such as an application that enables messaging devices using SMS messages, MMS messages, RCS messages, email messages, Whatsapp® messages, imessages, or chatbot messages. An example architecture for a UE, such as UE 102 and UE 104, is illustrated in FIG. 4 and described below in detail with reference to that figure.

The network 106 may be any sort of network including access point(s) offering wireless connectivity to the UE 102 and UE 104. Such a network 106 may comprise a plurality of networks, such as networks of different network operators each having its own core network and access networks, or may be the network of a single network operator. The access point(s) of the network 106 may comprise base stations, Wi-Fi access points, etc. with any generation(s) of network technology.

In some implementations, the message center/server 108 may be any sort of device, physical or virtual, and may be part of the network 106 or connected through the network 106. The message center/server 108 may be a service associated with the messaging exchange between the UE 102 and the UE 104. The message center/server 108 may help establish the messaging exchange, may maintain status of the UE 102 and UE 104, and, in some examples, may perform some or all of the operations discussed with respect to UE 102 and UE 104. In other examples, the message center/server 108 may simply be involved in one or both of establishing the messaging exchange or maintaining UE status.

In various implementations, the UI 110 shown in FIG. 1 may comprise a graphic user interface (GUI) rendered to a display of the UE 102 for a messaging platform of the UE 102. The messaging platform may be a native application of the UE 102 or a third-party application and may interface with other applications or services of the UE 102. As shown in FIG. 1, each message of the messaging platform includes a textual representation of input from a user rendered in a comment bubble. The users may provide input by typing, either on a physical keyboard or a touchscreen keyboard, or through voice input that is then processed into a textual representation. The UI 110 may indicate a source of each message by, e.g., displaying messages on different sides of the UI 110 depending on their sources. Also, as noted previously, the messages may be SMS messages, MMS messages, RCS messages, email messages, Whatsapp® messages, imessages, or chatbot messages.

When providing input, a user may include a formula, such as a sequence of numbers subject to mathematical operations. These may be prices (e.g., prices of parts or services in a total estimate, etc.), components of an average or median, etc. The operation(s) to be performed on the numbers may be part of the input or in some way indicated along with the input. For example, if a user enters a sequence of numbers and it is unclear what operation is intended on them, the messaging platform may recognize this and render a UI prompt on the UE 102 providing selectable options (e.g., "add", "multiply", "subtract", "divide", "average", "median", etc.).

In various implementations, while input is being provided or after it is provided (e.g., when a user chooses to submit a message), the messaging platform of the UE 102 determines if the textual representation of the input includes a formula and, if it does, calculates a result from the formula. The logic for this is represented at 112 in FIG. 1. In some implementations, the determining is based on inclusion of a special character as part of the formula. For example, the formula could be proceeded by an apostrophe, a double question mark, an equal sign, or any one or more characters which are unlikely to otherwise appear in relative proximity to the formula. Such special characters, as they would be depicted in a UI, are shown at 114. In other implementations, at 116, the messaging platform may automatically recognize a formula by its combination of numbers and operators. The UE 102 may then proceed to calculate the result or may first render a UI prompt in front of the UI 110, asking the user whether the user would like the result of the formula to be calculated. Such a prompt may also ask whether the user would like the result to be displayed on the UE 102, sent to the UE 104, etc. In other implementations, either while entering the formula or after completing message entry, the user may press a key or button of the phone (e.g., double press the increase volume button) to cause the messaging platform of the UE 102 to determine the presence of the formula and calculate the result. Such a key/button press is shown at 118. In further implementations, at 120, AI and machine learning techniques may be used to determine when the user has entered a formula, when the user would like the result calculated, and when the user would like the result displayed and/or sent to the UE 104. Such AI and machine learning may involve observations of user behavior in conjunction with the message input and with other features on the UE 102 (e.g., does the user browse to a calculator of the UE 102 and reenter the numbers and operators of the formula, etc.).

In some implementations, calculation of a result from the formula may be followed by its display in the UI 110, either in place of the formula or in addition to the formula. For example, the result may be displayed in place of the formula, shown as a hyperlink or button or bolded number. User interaction with the displayed result (e.g., clicking on the displayed result) may then result in its replacement with the formula or with the formula displayed as a pop-up adjacent to the result.

At 122, the UE 102 provides a message including the formula to the UE 104. The message structure may depend on the message type (i.e., whether the message is an SMS message, an MMS message, an RCS message, an email message, a Whatsapp® message, an imessage, a chatbot message, etc.). For example, when the message is an RCS message, the message may be structured in extensible markup language (XML). The XML may then be used to specify the formula as a formula and, if included, the result as a formula result. Once generated, the message may be transmitted to the UE 104 over the network 106 and many, in some implementations, be transmitted through the message center/server 108.

In various implementations, the UE 104, upon receiving the message, at 124, from the UE 102, processes the incoming message with its messaging platform in order to display the received message in a UI 128 for the messaging exchange with UE 102. The messaging platform of UE 104 may determine, at 126, if the textual representation in the message includes a formula. Such analysis may take the same form as the analysis performed by the UE 102 or may be guided by the structure of the received message (e.g., an XML tag) or by headers or metadata of the message. Similar analysis may be performed to determine whether the message includes a result from the formula.

When the message is determined, at 126, to include a formula and result, the result may be displayed in a UI 128 in place of the formula or in addition to the formula. In some examples, before displaying the result, the UE 104 may surface a UI prompt as a pop-up GUI asking the user whether the user desires to see the result, the formula, or both. In other examples, defaults—such as automatically displaying the result—may be followed. In further examples, such defaults may themselves be developed through AI and machine learning, taking note of user behaviors (e.g., browsing to a calculator application) and adjusted defaults accordingly.

When the message does not include a result from the formula, the UE 104 may calculate, at 126, the result. Such determining and calculating may be guided by special characters, automatic processing/UI prompts, key/button presses, or AI and machine learning in a same or similar manner as described above with respect to UE 102. Once the result has been calculated, it may be displayed on UI 128. UI prompts and defaults, such as described above for situations when the message includes a result, may also apply when the result is calculated by the UE 104. User input provided in order to cause the UE 104 to calculate the result may result in differing UI prompts or defaults, however (e.g., if the user indicates a desire to calculate a result for a formula, this may be deemed a sufficient indication of the user's desire to display the result).

In some implementations, display of the textual representation included in the message in UI 128 may show the result in place of the formula or in addition to the formula. For example, the result may be displayed in place of the formula, shown as a hyperlink or button or bolded number. User interaction with the displayed result (e.g., clicking on the displayed result) may then result in its replacement with the formula or with the formula displayed as a pop-up adjacent to the result.

Example Operations

Figure 3:
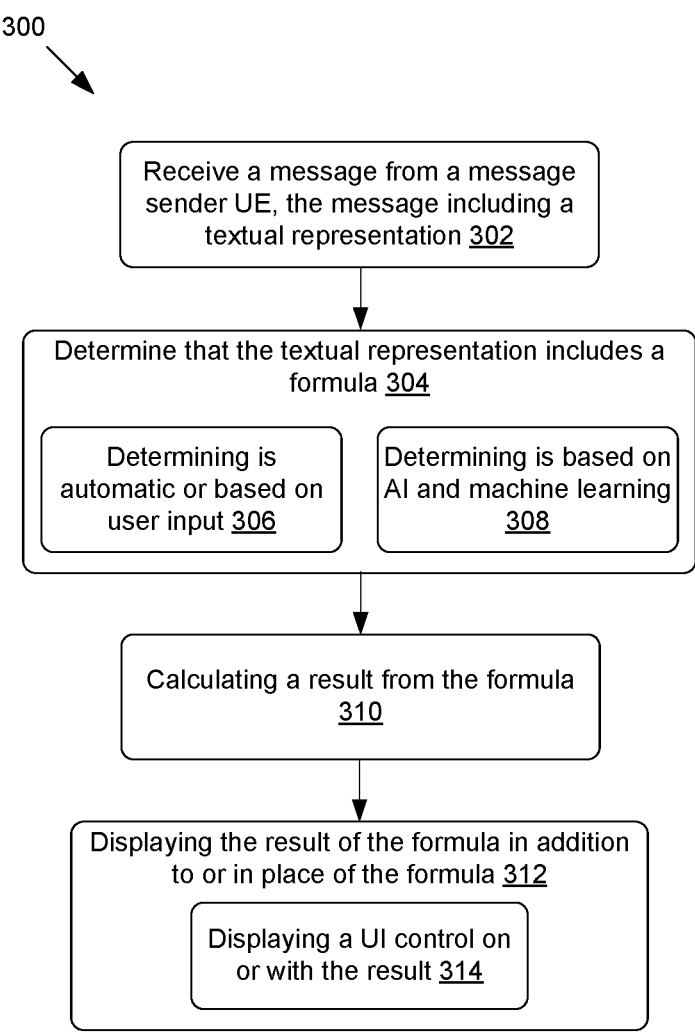
FIG. 3 is a flow diagram of an illustrative process at a message recipient UE for receiving a message from a message sender UE that includes at least a formula, determining that the message includes the formula and, if a result of the formula is not included in the message, calculating the result, and displaying at least the result to the message recipient in a textual representation of the message on a UI of the message recipient UE.

FIGS. 2 and 3 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 2 is a flow diagram of an illustrative process at a message sender UE for determining that a textual representation of input from the message sender includes a formula, calculating a result of the formula, and providing the result and the formula in a message to a message recipient UE. At 202, a message sender UE (for FIG. 2, "the UE") receives input associated with a textual representation for a message to a message recipient. The message may comprise a plurality of messages and the textual representation may be spread over multiple ones of the plurality of messages. Further, the input may be typed by the user or spoken by the user. Additionally or instead, the UE may receive user input, such as a textual character included with the input or a user control activated by user, as part of a formula included in the input or while entering such a formula. In some implementations, the message may be one of a SMS message, a MMS message, a RCS message, an email message, a Whatsapp® message, an imessage, or a chatbot message.

At 204, the UE determines that the textual representation of the input received from the user includes a formula. The textual representation is at least part of the message for the message recipient. At 206, the determining is automatic or is based on a user input indicative of a desire for calculation of a result from the formula. At 208, the determining is based on artificial intelligence and machine learning.

At 210, the UE calculates the result from the formula. In some implementations, the determining, at 204, and the calculating, at 210, are performed by a messaging platform of the UE.

At 212, the UE displays the result from the formula either in place of the formula in a user interface (UI) showing the textual representation or in addition to the formula in the UI. At 214, the displaying comprises displaying a UI control on or with the result that, when activated (e.g., clicked), displays the formula as well or in place of the result on the UI.

At 216, the UE provides, via the message, the formula and the result to a UE of the message recipient.

FIG. 3 is a flow diagram of an illustrative process at a message recipient UE for receiving a message from a message sender UE that includes at least a formula, determining that the message includes the formula and, if a result of the formula is not included in the message, calculating the result, and displaying at least the result to the message recipient in a textual representation of the message on a UI of the message recipient UE. At 302, a message recipient UE (for FIG. 3, "the UE") receives a message from a message sender UE. The message includes at least a textual representation of input received from the message sender. In some implementations, the message may be one of a SMS message, a MMS message, a RCS message, an email message, a Whatsapp® message, an imessage, or a chatbot message.

At 304, the UE determines that the textual representation includes a formula. At 306, the determining is automatic or is based on a user input indicative of a message sender desire for calculation of the result. At 308, the determining is based on artificial intelligence and machine learning.

At 310, the UE calculates a result from the formula. In some implementations, the determining, at 304, and the calculating, at 310, are performed by a messaging platform of the UE. In further implementations, the UE may determine at 304 that the message includes both a formula and the result, and the UE may forgo calculating the result.

At 312, the UE displays the result from the formula either in place of the formula in a user interface (UI) showing the textual representation or in addition to the formula in the UI. At 314, the displaying comprises displaying a UI control on or with the result that, when activated (e.g., clicked), displays the formula as well or in place of the result on the UI.

Example Architecture

FIG. 4 is a schematic diagram of an example system architecture of a UE 400 that is configured to determine that a textual representation of user input in a message includes a formula and to calculate a result of that formula. The UE 400 may be a message sender UE 102 or a message recipient UE 104, or both depending on context. The UE 400 can have at least one memory 402, processor(s) 404, one or more transceivers 406, a display 408, output devices 410, input devices 412, and/or a drive unit 414 including a machine readable medium 416. The memory 402 may include a messaging platform 418 and other modules and data 420.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 400. Any such non-transitory computer-readable media may be part of the UE 400.

The memory 402 can include one or more software or firmware elements, such as computer-readable instructions that are executable by the one or more processors 404. For example, the memory 402 can store computer-executable instructions associated with messaging platform 418 and other modules and data 420. The messaging platform 418 may establish a session with a messaging platform of another UE and, in some implementations, with a messaging center. The messaging platform 418 may also participate in rendering the textual representations to the display 408 and in receiving user input through the display 408 and/or input devices 412. Further, the messaging platform 418 may participate in any or all of the operations described herein, such as determining that a textual representation includes a formula and calculating the result of that formula. The other modules and data 420, which can be utilized by the UE 400 to perform or enable performing any action taken by the UE 400. The other modules and data 420 can include a UE platform, operating system, and applications, and data utilized by the platform, operating system, and applications.

In various examples, the processor(s) 404 can be a CPU, a graphics processing unit (GPU), or both CPU and GPU, or any other type of processing unit. Each of the one or more processor(s) 404 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 404 may also be responsible for executing all computer applications stored in the memory 402, which can be associated with types of volatile (RAM) and/or nonvolatile (ROM) memory.

The transceivers 406 can include modems, interfaces, antennas, and/or other components that perform or assist in exchanging RF communications with base stations, Wi-Fi access points, or otherwise implement connections with one or more networks.

The display 408 can be a liquid crystal display or any other type of display commonly used in UEs. For example, the display 408 may be a touch-sensitive display screen and can thus also act as an input device or keypad, such as for providing a soft-key keyboard, navigation buttons, or any other type of input.

The output devices 410 can include any sort of output devices known in the art, such as the display 408, speakers, a vibrating mechanism, and/or a tactile feedback mechanism. Output devices 410 can also include ports for one or more peripheral devices, such as headphones, peripheral speakers, and/or a peripheral display.

The input devices 412 can include any sort of input devices known in the art. For example, input devices 412 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism. Also, the input devices 412 may include other physical buttons or keys disposed at any location on the UE 400

The machine readable medium 416 of a drive unit 414 can store one or more sets of instructions, such as software or firmware, that embodies any one or more of the methodologies or functions described herein. The instructions can also reside, completely or at least partially, within the memory 402, processor(s) 404, and/or transceiver(s) 406 during execution thereof by the UE 400.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   determining, by a user equipment (UE) that a textual representation of input received from a user includes a formula, wherein the textual representation is at least part of a message for a message recipient;
   calculating, by the UE, a result from the formula; and
   providing, by the UE and via the message, the formula and the result to a UE of the message recipient.

2. The method of claim 1, further comprising displaying the result from the formula either in place of the formula in a user interface (UI) showing the textual representation or in addition to the formula in the UI.

3. The method of claim 2, wherein the displaying comprises displaying a UI control on or with the result that, when activated, displays the formula as well or in place of the result on the UI.

4. The method of claim 1, wherein the determining is automatic or is based on a user input indicative of a desire for calculation of the result.

5. The method of claim 4, wherein the user input is a textual character included with the input or a user control activated by user.

6. The method of claim 1, wherein the determining is based on artificial intelligence and machine learning.

7. The method of claim 1, wherein the input is typed by the user or spoken by the user.

8. The method of claim 1, wherein the message is one of a short message service (SMS) message, a multimedia message service (MMS) message, a rich communication service (RCS) message, an email message, a Whatsapp® message, an imessage, or a chatbot message.

9. The method of claim 1, wherein the determining and the calculating are performed by a messaging platform of the UE.

10. The method of claim 1, wherein the message comprises a plurality of messages and the textual representation is spread over multiple ones of the plurality of messages.

11. A user equipment (UE) comprising:

a processor; and programming instructions configured to be executed by the processor to perform operations including:

determining that a textual representation of input received from a user includes a formula, wherein the textual representation is at least part of a message for a message recipient;

calculating a result from the formula; and providing, via the message, the formula and the result to a UE of the message recipient.

12. The UE of claim 11, wherein the operations further comprise displaying the result from the formula either in place of the formula in a user interface (UI) showing the textual representation or in addition to the formula in the UI.

13. The UE of claim 12, wherein the displaying comprises displaying a UI control on or with the result that, when activated, displays the formula as well or in place of the result on the UI.

14. The UE of claim 11, wherein the determining is automatic or is based on a user input indicative of a desire for calculation of the result.

15. A method comprising:

receiving, by a user equipment (UE), a message from a UE of a message sender, the message including at least a textual representation of input received from the message sender;

determining, by the UE, that the textual representation includes a formula;

calculating, by the UE, a result from the formula; and displaying, by the UE, the result from the formula either in place of the formula in a user interface (UI) showing the textual representation or in addition to the formula in the UI.

16. The method of claim 15, wherein the displaying comprises displaying a UI control on or with the result that, when activated, displays the formula as well or in place of the result on the UI.

17. The method of claim 15, wherein the determining is automatic or is based on a user input indicative of a desire for calculation of the result.

18. The method of claim 15, wherein the determining is based on artificial intelligence and machine learning.

19. The method of claim 15, wherein the message is one of a short message service (SMS) message, a multimedia message service (MMS) message, a rich communication service (RCS) message, an email message, a Whatsapp® message, an imessage, or a chatbot message.

20. The method of claim 15, wherein the determining and the calculating are performed by a messaging platform of the UE.

\* \* \* \* \*